March 17, 1925.
P. EHRMANN
COOLING DEVICE FOR STATORS OF ELECTRIC MACHINES
Original Filed March 18, 1921
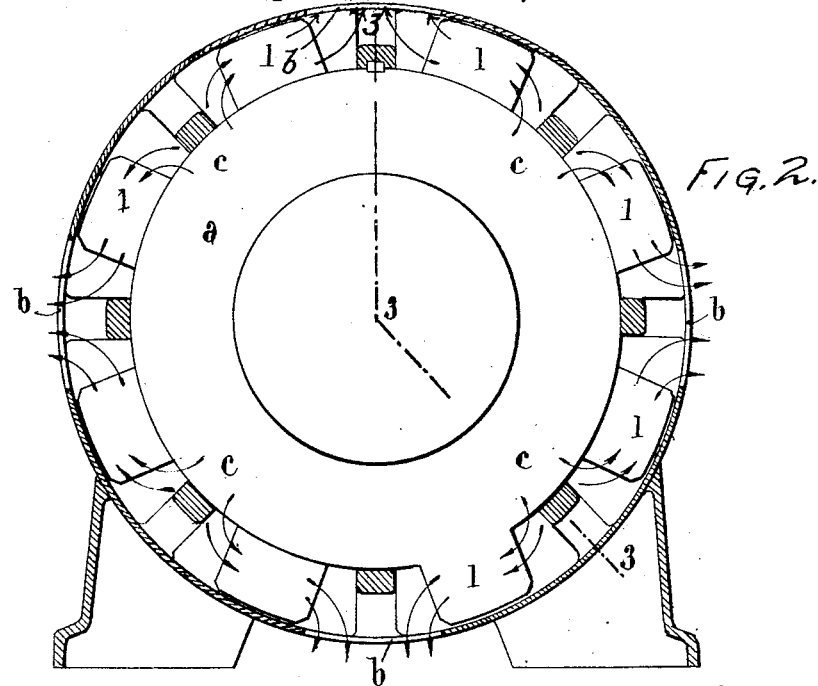
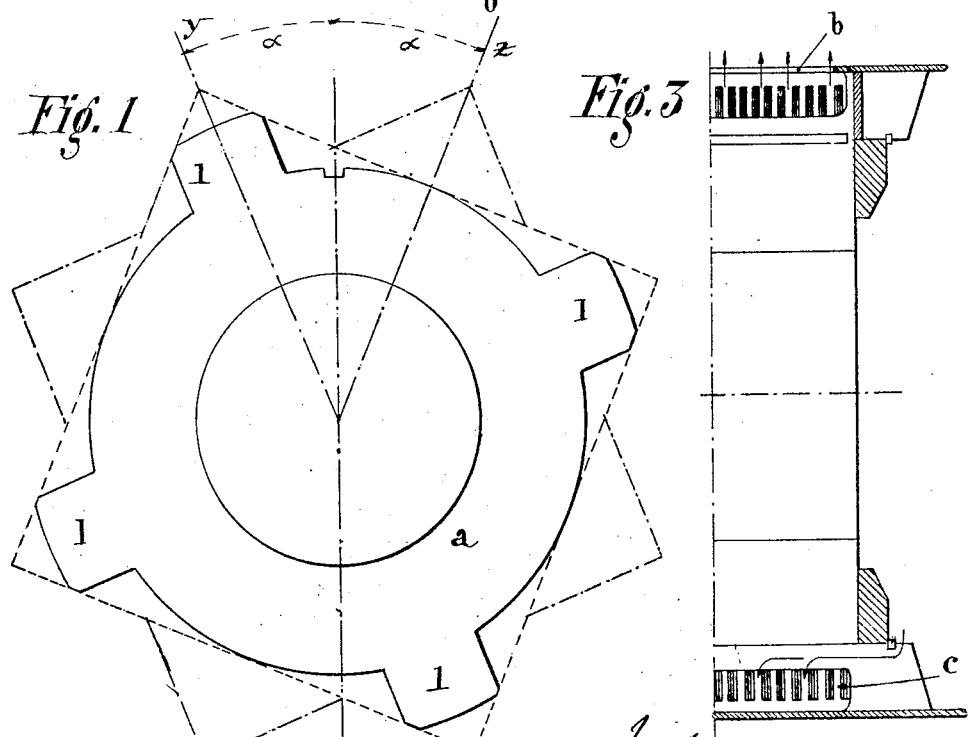

Patented Mar. 17, 1925.

1,529,993

UNITED STATES PATENT OFFICE.

PAUL EHRMANN, OF PARIS, FRANCE.

COOLING DEVICE FOR STATORS OF ELECTRIC MACHINES.

Original application filed March 18, 1921, Serial No. 456,136. Divided and this application filed April 4, 1922. Serial No. 549,509.

*To all whom it may concern:*

Be it known that I, PAUL EHRMANN, citizen of the Republic of France, residing at Paris, France, have invented certain new and useful Improvements in Cooling Devices for Stators of Electric Machines (for which I have obtained a patent in France under No. 497,839 on an application filed April 4, 1919, a patent in Switzerland under No. 91,694 on an application filed March 17, 1920, a patent in Belgium under No. 286,321 on an application filed April 21, 1920, two patents in Great Britain under Nos. 142,828 and 162,281 on an application filed on May 4, 1920, and subsequently divided, and for which I have also made application for patent in Germany on April 15, 1920), of which the following is a specification.

My invention relates to improvements applied to cooling devices for the stators of electrical machines such as described in my application, Ser. No. 456,136 filed March 18, 1921, of which this is a division and its object is to provide laminated masses presenting considerable cooling surface.

The invention has also for its object the utilization for obtaining cooling fins of those portions of sheet metal plates which usually constitute the normal waste in cutting the plates.

The laminated masses for the stators of electrical machines according to my invention are characterized essentially by the external contour of the plates presenting a configuration mainly circular but provided with projections intended to constitute the cooling fins, the successive plates or groups of plates being staggered relatively to one another so as to provide air circulation channels between the cooling fins the surfaces of which present a considerable exposed area.

The preferred form of the invention is illustrated by way of example on the accompanying drawings, in which:—

Fig. 1 shows a plate with four cooling fins entering into the constitution of a laminated mass according to my invention.

Fig. 2 is an elevation of a laminated mass for a stator of an electric machine, obtained by the superposition of sheets according to that shown in Fig. 1.

Fig. 3 is a section along the line 3—3 of Fig. 2.

A plate or sheet used for making up a laminated mass for a stator of an electric machine according to my invention is shown in Fig. 1. This sheet $a$ has an external contour mainly circular but provided with four projecting cooling fins $l$ situated at the ends of two diameters mutually at right angles, each of said fins projecting from the circular contour.

To make these plates, the following method may be pursued with advantage: A polygon of a number of sides equal to the number of fins, a square for example, is drawn at the external periphery of the plate; in this case square plates are selected. The plate is cut circular within such square leaving at each angle of the square a cooling fin between the sides of the square and the circumference of the plate. Thus waste in cutting is reduced as much as possible.

To produce a laminated mass for a stator of an electric machine by means of the above described plates, it suffices to superpose the plates alternately in the positions $y$ and $z$ (Fig. 1). Thus a stator (Figs. 2 and 3) can be obtained provided with eight cooling elements of large surface, the thickness of the cooling channels being equal to the thickness of the fins $l$.

The circulation of the cooling air in the above stator is effected as follows:

Air under pressure obtained from the current of ventilating air of the electric machine enters the interior of such machine, as indicated at $c$ at the bottom of Fig. 3. The current of air entering the region $c$ is divided into two elementary currents which can escape through the openings $b$ of the structure (Figs. 2 and 3) after having completely swept the lateral surfaces of all the fins $l$ carried by the laminated mass in one part or another in the vicinity of the region of entry $c$.

The above described arrangement obviously permits various modifications within the scope of this invention.

In particular, the air admission openings $c$ and outlets $b$ may be located and grouped at will, as well as the supply and evacuation channels for the air in the structure of stators of electric machines. Instead of providing four air admission openings $c$ and four outlet openings $b$, in the case of low powered machines only two admission openings $c$ and two outlet openings $b$ may be provided.

Likewise, the angle $\alpha$ (Fig. 1) may be varied, which enables laminated masses to be made by means of plates identically alike occupying three, four or more different positions relatively to each other.

To impart greater strength to the fins, obviously each plate, a, can be replaced by a group of similar plates exactly superposed. It suffices then, in order to make the laminated mass for a stator of an electric machine, to superpose such groups of plates a alternately in the positions y and z, as above described.

The invention thus enables laminated masses for stators of electric machines with large cooling surfaces to be obtained at very slightly increased net cost.

Claims:

1. In a stator for electric machines the combination of plates of circular external contour having lugs projecting at intervals beyond the circular contour and constituting cooling fins, the said plates being stacked up in a certain number of positions offset relative to each other, the said cooling fins thus forming a plurality of sets parallel to the axis of the stator, each set being composed of a plurality of fins, the sets being separated from each other by free spaces utilized as the supporting surfaces of the laminated core, a frame enclosing all the said plates providing abutments for the support of the said plates; air inlet conduits provided in the said frame for guiding currents of air parallel to the axis of the stator, each of the said air currents being divided into elementary currents passing through the free spaces provided between the cooling fins of the same group and sweeping the said fins over their entire surface, discharge openings for the hot air being provided in the said frame adjacent the said free spaces.

2. In a stator for electric machines, the combination of plates of circular external contour having lugs projecting at intervals beyond the circular contour and constituting cooling fins, the said plates being stacked in a certain number of positions offset relative to each other, the said cooling fins thus forming a plurality of sets parallel to the axis of the stator, each set being made up of a plurality of fins separated from each other by free spaces utilized as supporting faces of the laminated core, a frame enclosing all the said plates providing abutments for the support of said plates, air inlet conduits provided in the said frame guiding the currents of air parallel to the axis of the stator, each of the said air currents circulating between two sets of successive fins and being divided into elementary currents passing through the free spaces provided between the fins of the said two sets and sweeping the said fins over their entire surface, discharge openings for the hot air being provided in the said frame adjacent the said free spaces.

In testimony whereof I affixed my signature.

PAUL EHRMANN.